United States Patent
Wu et al.

(10) Patent No.: US 8,787,673 B2
(45) Date of Patent: Jul. 22, 2014

(54) SYSTEM AND METHOD OF DETERMINING BUILDING NUMBERS

(75) Inventors: Bo Wu, Mountain View, CA (US); Alessandro Bissacco, Los Angeles, CA (US); Raymond W. Smith, Los Altos, CA (US); Kong man Cheung, San Francisco, CA (US); Andrea Frome, Berkeley, CA (US); Shlomo Urbach, Rehovot (IL)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 13/181,081

(22) Filed: Jul. 12, 2011

(65) Prior Publication Data
US 2012/0008865 A1      Jan. 12, 2012

Related U.S. Application Data

(60) Provisional application No. 61/363,565, filed on Jul. 12, 2010.

(51) Int. Cl.
*G06K 9/18*      (2006.01)

(52) U.S. Cl.
CPC ........................................ *G06K 9/18* (2013.01)
USPC ........... 382/182; 382/203; 382/229; 382/294; 382/299

(58) Field of Classification Search
CPC ........... G06F 17/30251; G06Q 30/018; G06Q 30/02; G06K 9/3258; B07C 3/20
USPC .......................... 382/299, 187, 185, 101, 177
See application file for complete search history.

(56) References Cited

U.S. PATENT DOCUMENTS

| | | | | |
|---|---|---|---|---|
| 5,031,223 A | * | 7/1991 | Rosenbaum et al. | 382/101 |
| 5,410,611 A | * | 4/1995 | Huttenlocher et al. | 382/177 |
| 5,491,760 A | * | 2/1996 | Withgott et al. | 382/203 |
| 5,727,081 A | * | 3/1998 | Burges et al. | 382/229 |
| 5,961,571 A | * | 10/1999 | Gorr et al. | 701/494 |
| 6,233,523 B1 | | 5/2001 | Sood | |
| 6,246,794 B1 | | 6/2001 | Kagehiro et al. | |
| 7,006,710 B2 | * | 2/2006 | Riley et al. | 382/294 |

(Continued)

FOREIGN PATENT DOCUMENTS

KR      10-2010-0007722 A      1/2010

OTHER PUBLICATIONS

International Search Report, PCT/US2011/043671, dated Jan. 19, 2012.

*Primary Examiner* — Vu Le
*Assistant Examiner* — Aklilu Woldemariam
(74) *Attorney, Agent, or Firm* — Lerner, David, Littenberg, Krumholz & Mentlik, LLP

(57) ABSTRACT

A system and method is provided for automatically recognizing building numbers in street level images. In one aspect, a processor selects a street level image that is likely to be near an address of interest. The processor identifies those portions of the image that are visually similar to street numbers, and then extracts the numeric values of the characters displayed in such portions. If an extracted value corresponds with the building number of the address of interest such as being substantially equal to the address of interest, the extracted value and the image portion are displayed to a human operator. The human operator confirms, by looking at the image portion, whether the image portion appears to be a building number that matches the extracted value. If so, the processor stores a value that associates that building number with the street level image.

18 Claims, 12 Drawing Sheets

(56) References Cited

U.S. PATENT DOCUMENTS

| | | |
|---|---|---|
| 7,356,162 B2 * | 4/2008 | Caillon .......................... 382/101 |
| 7,406,216 B2 * | 7/2008 | Baer et al. ..................... 382/299 |
| 2007/0043504 A1 * | 2/2007 | Dorfman et al. .............. 701/213 |
| 2008/0002914 A1 * | 1/2008 | Vincent et al. ................ 382/299 |
| 2008/0189130 A1 | 8/2008 | Dorfman et al. |
| 2008/0285886 A1 * | 11/2008 | Allen ............................. 382/284 |
| 2009/0179895 A1 * | 7/2009 | Zhu et al. ...................... 345/424 |

* cited by examiner

SYSTEM AND METHOD OF DETERMINING BUILDING NUMBERS

CROSS-REFERENCE TO RELATED APPLICATIONS

This application claims the benefit of priority to U.S. Prov. Pat. App. Ser. No. 61,363,565, filed Jul. 12, 2010, titled "SYSTEM AND METHOD OF DETERMINING BUILDING NUMBERS," the disclosure of which is incorporated by reference in its entirety herein.

BACKGROUND

Using the Internet today, a user may search for the postal address of a given business. For example, by providing the business name to an online search provider, the online search provider may return the postal address of the business. However, there may be instances where a user may want to confirm that the business he or she had in mind is the correct business. For example, the user may have an image of the business in his or her mind, but may be unable to recall the correct business name or may have confused the image of the business with another business name.

To confirm that the user is thinking of the correct business, it may be helpful to provide a street level image of the business to the user. However, in capturing street level images, the number of captured street level images can be very large, and not every captured street level image depicts a business storefront. Moreover, because street level images may be captured at a high framerate, it is possible that a single postal address is associated with multiple, if not hundreds, of street level images. Alternatively, if street level images are captured a slower framerate, it is possible that not every street level image depicts a clear business storefront. For example, the street level images, whether captured at a high framerate or a low framerate, may have obstructed views of the business storefront, may capture the business storefront at odd angles, may be unfocused, or may have other technical issues Thus, before providing a street level image to the user for a given address, it may be helpful to confirm whether the business storefront is displaying building numbers or other postal identifiers to ensure that the street level image provided to the user is a relatively clear street level image.

BRIEF SUMMARY

Thus, before providing a street level image to the user for a given address, it may be helpful to confirm whether the business storefront is displaying building numbers or other postal identifiers to ensure that the street level image provided to the user is a relatively clear street level image.

In one embodiment, a method includes selecting an image associated with a street address that includes a building number, identifying, with a processor, a portion of the image containing characters associated with building numbers, and extracting, with the processor, an alphanumeric value from the characters within the portion of the image. The method may also include comparing the alphanumeric value to the building number of the street address, displaying, to a human operator and dependent upon the result of such comparison, the alphanumeric value and the portion of the image containing characters, and receiving, from a human operator, an indication of whether the alphanumeric value is a building number. Moreover, the method may include storing, in a memory accessible by a processor, an association between the alphanumeric value and the image dependent upon the indication.

In another embodiment of the method, the image is a street level image.

In a further embodiment of the method, identifying a portion of the image containing characters includes comparing a plurality of portions of the image to image patterns of building numbers.

In yet another embodiment of the method, extracting alphanumeric values includes applying optical character recognition to the portion of the image containing characters.

In yet a further embodiment of the method, comparing the alphanumeric value to the building number includes comparing the alphanumeric value to a set of values that includes the building number of the street address.

In another embodiment of the method, comparing the alphanumeric value to the building number includes determining whether the alphanumeric value comprises a numeric value that is equivalent to the building number of the street address.

In a further embodiment of the method, displaying the alphanumeric value and the portion of the image to a human operator includes transmitting, over a network, a proposed building number based on the alphanumeric value and the image portion to a computer operated by a human.

In yet another embodiment of the method, the indication includes a confirmation value that was transmitted from a network by a computer operated by the human operator, and the confirmation value is determined based on whether the human operator confirmed that the alphanumeric value is a building number.

In yet a further embodiment of the method, storing an association between the alphanumeric value and the image dependent upon the indication includes storing a value linking at least the portion of the street level image to the building number.

A system is also disclosed. In one embodiment, the system includes a memory operative to store a street level image, and a processor in communication with the memory, the processor being operative to identify a portion of the street level image such that the portion contains characters associated with building numbers and extract an alphanumeric value representing the characters within the portion. The processor may be further operative to compare the alphanumeric value to a range of building numbers that are expected to be near the geographical location at which the street level image was captured, and transmit the street level image and the alphanumeric value to a client computer when the alphanumeric value corresponds with such range. The processor may be further operative to receive a confirmation whether the street level image corresponds to a street address, such street address including the alphanumeric value.

In another embodiment of the system, the processor is operative to identify the portion of the image containing characters by comparing a plurality of portions of the image to image patterns of building numbers.

In a further embodiment of the system, the processor is operative to extract the alphanumeric value by applying optical character recognition to the portion of the image containing characters.

In yet another embodiment of the system, the processor is operative to compare the alphanumeric value to the range of building numbers by comparing the alphanumeric value to a set of values that includes the building numbers of the street address.

In yet a further embodiment of the system, the processor is operative to compare the alphanumeric value to the building number by determining whether the alphanumeric value comprises a numeric value that is equivalent to the building number of the street address.

In another embodiment of the system, the processor is further operative to transmit a proposed building number based on the alphanumeric value and the image portion in confirming whether the street level image corresponds to the street address.

In a further embodiment of the system, the processor is further operative to store, in the memory, an association linking at least the portion of the street level image to one or more of the building numbers associated with the portion.

Another method is also disclosed. In one embodiment, the method includes receiving a first set of images of numbers on buildings associated with the address of such building, receiving a second set of images that do not contain numbers on buildings associated with the address of a building, and determining, with a processor, a characteristic that is present within a plurality of the images of the first set but is not present within the image of the second set. The method may also include receiving an image of a building, determining, with the processor, a value indicative of whether a portion of the image of the building includes numbers matching the characteristic, and storing, in a computer-accessible image and dependent upon such value, an identification of the portion of the image of the building that matches the characteristic.

In another embodiment of the method, the first set of images and the second set of images are selected by a human operator from among a plurality of images.

In a further embodiment of the method, the characteristic comprises an image pattern.

In yet another embodiment of the method, there at least 10 images in the first set and 10 images in the second set.

Yet another method is disclosed. In one embodiment, the method includes selecting an image associated with a street address that includes a building number, identifying, with a processor, a portion of the image containing characters associated with building numbers, and extracting, with the processor, an alphanumeric value from the characters within the portion. The method may further include comparing the alphanumeric value to the building number of the street address and storing, in a memory accessible by the processor, an association between the alphanumeric value and the image dependent upon the comparison.

DETAILED DESCRIPTION

The present disclosure relates to systems and methodologies for determining building numbers in street level images and, in particular, to using a human moderator to confirm that a street level image contains a previously identified building number. The present disclosure facilitates the correlation of postal addresses and street level images of the buildings appearing at the corresponding postal addresses.

In one aspect, the system and method detects and recognizes building numbers in images. For example, given a street address, the system and method may retrieve images of buildings that are likely to be proximate to the given address (such as by interpolating a latitude/longitude from the street address and querying a database of captured images tagged with the latitude/longitude of the camera's position when the image was captured). A computer may then analyze the retrieved image and search for portions of the image that are visually similar to building numbers, e.g., portions that have characteristics similar to the visual characteristics of pictures of building numbers. A computer may then determine the value, if any, of the numeric characters appearing in those portions. By way of example, where the camera captured an image of a building with the street address "123" painted on the door, the computer may extract the integer value "123" from that portion of the image by using an image recognition technique, such as optical character recognition (OCR).

The extracted values may then be compared to the street address that was used to retrieve the street level image. Where any of the extracted values match the street address, the image of the building may be shown to a human operator and a computer may prompt the human operator to confirm that the extracted value appears corresponds with the address of the building. For instance, the computer may display: the image captured by the camera, a highlight around the portion of the image that contains the potential building number, and, and a question that asks the human operator whether the extracted value matches a building number on the building.

Figure 1:
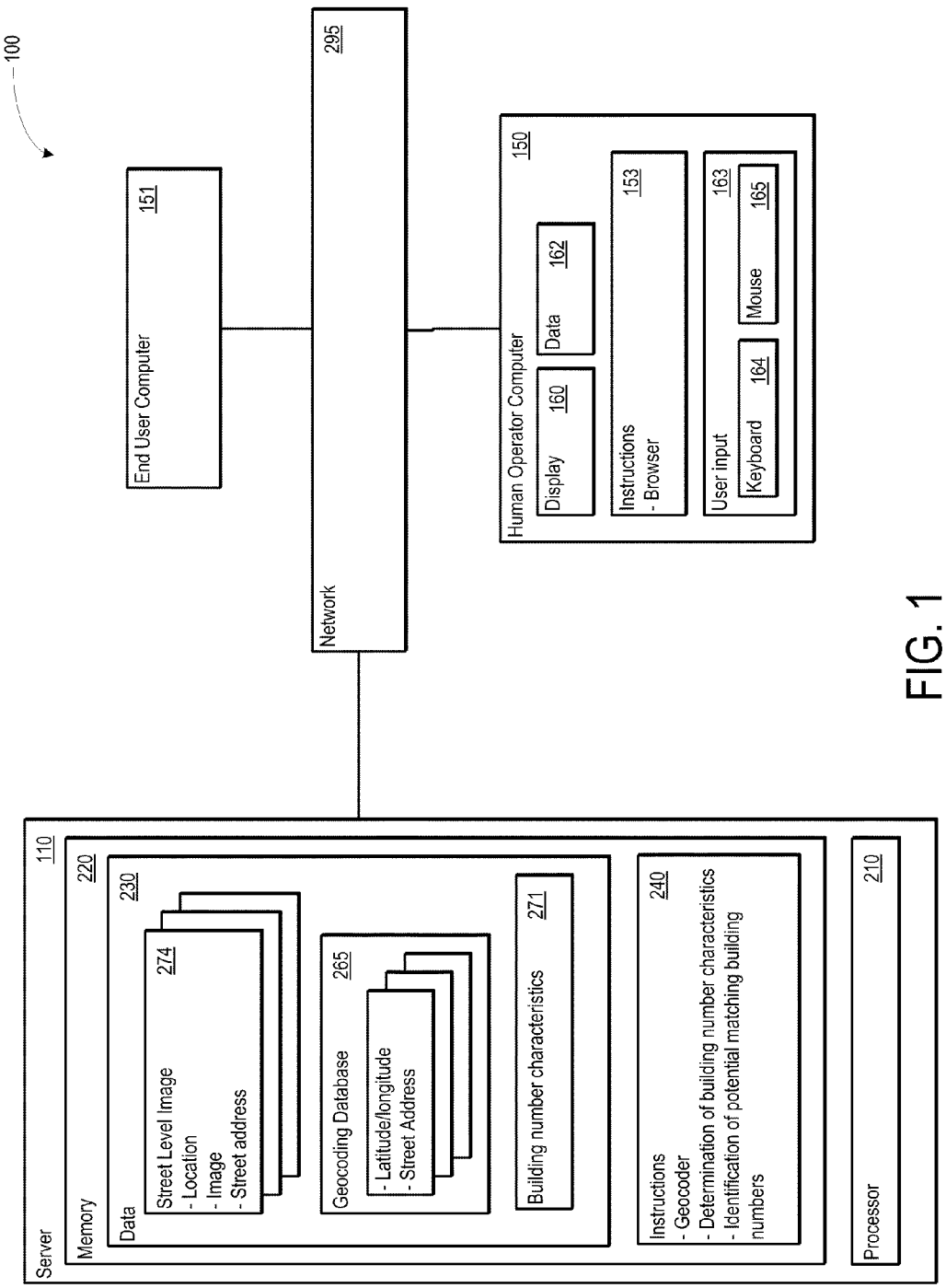
FIG. 1 illustrates an exemplary system for determining building numbers according to aspects of the disclosure.
Figure 2:
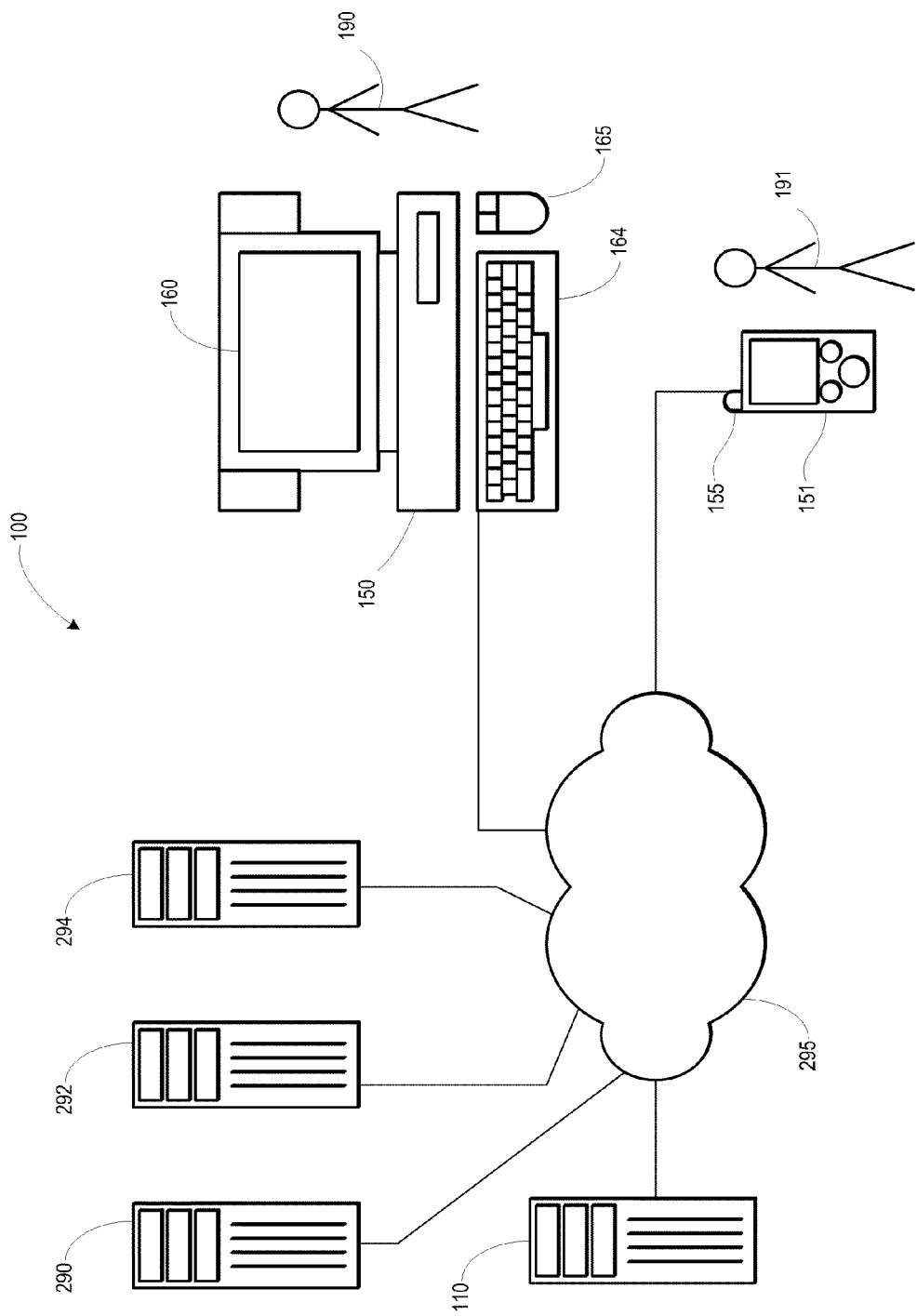
FIG. 2 illustrates an exemplary system for determining building numbers according to aspects of the disclosure.

FIGS. 1 and 2 illustrate an exemplary system 100 for determining building numbers according to aspects of the disclosure. As shown in these Figures, the system 100 may include a computer 110 containing a processor 210, a memory 220 and other components typically present in general purpose computers.

The memory 220 may store information accessible by the processor 210, including instructions 240 that may be executed by the processor 210. The memory 220 may also include data 230 that may be retrieved, manipulated or stored by the processor 210. The memory 220 may be of any type of memory capable of storing information accessible by the processor 210, such as a hard-drive, memory card, ROM, RAM, DVD, CD-ROM, write-capable, and read-only memories. The processor 210 may be any well-known processor, such as processors from the Intel Corporation, located in Santa Clara, Calif. or Advanced Micro Devices, Inc. ("AMD"), located in Sunnyvale, Calif. Alternatively, the processor 210 may be a dedicated controller such as an ASIC.

The instructions 240 may be any set of instructions to be executed directly (such as machine code) or indirectly (such as scripts) by the processor 210. In that regard, the terms "instructions," "routines", "steps" and "programs" may be used interchangeably herein. The instructions 240 may be stored in object code format for direct processing by the processor 210, or in any other computer language including scripts or collections of independent source code modules that are interpreted on demand or compiled in advance. Functions, methods and routines of the instructions 240 are explained in more detail below.

Data 230 may be retrieved, stored or modified by the processor 210 in accordance with the instructions 240. For instance, although the system and method is not limited by any particular data structure, the data 230 may be stored in computer registers, in a relational database as a table having a plurality of different fields and records, XML documents, or flat files. The data 230 may also be formatted in any computer-readable format such as, but not limited to, binary values or Unicode.

By further way of example only, image data (not shown) may be stored as bitmaps comprised of pixels that are stored in compressed or uncompressed, or lossless or lossy formats (e.g., JPEG), vector-based formats (e.g., SVG) or computer instructions for drawing graphics. Moreover, the data 230 may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor 210 and the memory 220 as being within the same block, it will be understood by those of ordinary skill in the art that the processor 210 and the memory 220 may actually comprise multiple processors and memories that may or may not be stored within the same physical housing. For example, some of the instructions 240 and data 230 may be stored on removable CD-ROM and others within a read-only computer chip. Some or all of the instructions 240 and data 230 may be stored in a location physically remote from, yet still accessible by, the processor 210. Similarly, the processor 210 may actually comprise a collection of processors, which may or may not operate in parallel.

In one aspect, the computer 110 is a server communicating with one or more client devices 150-51. For example, the computer 110 may be a web server.

Each of the client devices 150-51 may be configured similarly to the server 110, with a processor (not shown), memory, instructions 153, and data 162. With reference to FIG. 2, each client device 150-51 may be used by a person 190-191, respectively, such as having all of the internal components normally found in a personal computer. By way of example only, each client device may include a central processing unit (CPU), a display device 160 (for example, a monitor having a screen, a projector, a touch-screen, a small LCD screen, a television, or another device such as an electrical device that is operable to display information processed by the processor; in that regard, a processor displays information by providing the information directly or indirectly to a display), CD-ROM, hard drive, a user input 163 (for example, a keyboard 164, mouse 165, touch-screen or microphone), speakers, modem and/or network interface device (telephone, cable or otherwise) and all of the components used for connecting these elements to one another.

Although the client devices 150-51 may comprise full-sized personal computers, the system and method may also be used in connection with mobile devices capable of wirelessly exchanging data. For example, client device 151 may be a wireless-enabled PDA, such as a Blackberry phone, or an Internet-capable cellular phone. In either regard, the user may input information using a small keyboard (in the case of a Blackberry phone), a keypad (in the case of a typical cell phone), a touch screen (in the case of a PDA) or any other means of user input. In various aspects, the client devices and computers described herein may comprise any device capable of processing instructions and transmitting data to and from humans and other devices and computers including general purpose computers, network computers lacking local storage capability, game consoles, and set-top boxes for televisions.

Client devices 150-51 may include a component, such as circuits, to determine the geographic location of the device. For example, mobile device 151 may include a GPS receiver. By way of further example, the component may include software for determining the position of the device based on other signals received at the mobile device 151, such as signals received at a cell phone's antenna from one or more cell phone towers if the mobile device is a cell phone. In that regard, the provision of location data from a client device may occur automatically based on information received from such a component.

The server 110 and client devices 150-51 are capable of direct and indirect communication, such as over a network 295. Although only a few computers are depicted in FIGS. 1-2, it should be appreciated that the system 100 may include a large number of connected computers, with each different computer being at a different node of the network 295. For example, the system 110 may include the server 110 in communication with additional servers 290-294. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disc or memory chip. In other aspects, the information may be transmitted in a non-electronic format and manually entered into the system. Yet further, although some functions are indicated as taking place on a server and others on a client, various aspects of the system and method may be implemented by a single computer having a single processor.

The server 110 may store data representing street level images 274. Street level images 274 may comprise images of objects at geographic locations, captured by cameras at geographic locations, in a direction generally parallel to the ground.

Figure 5:
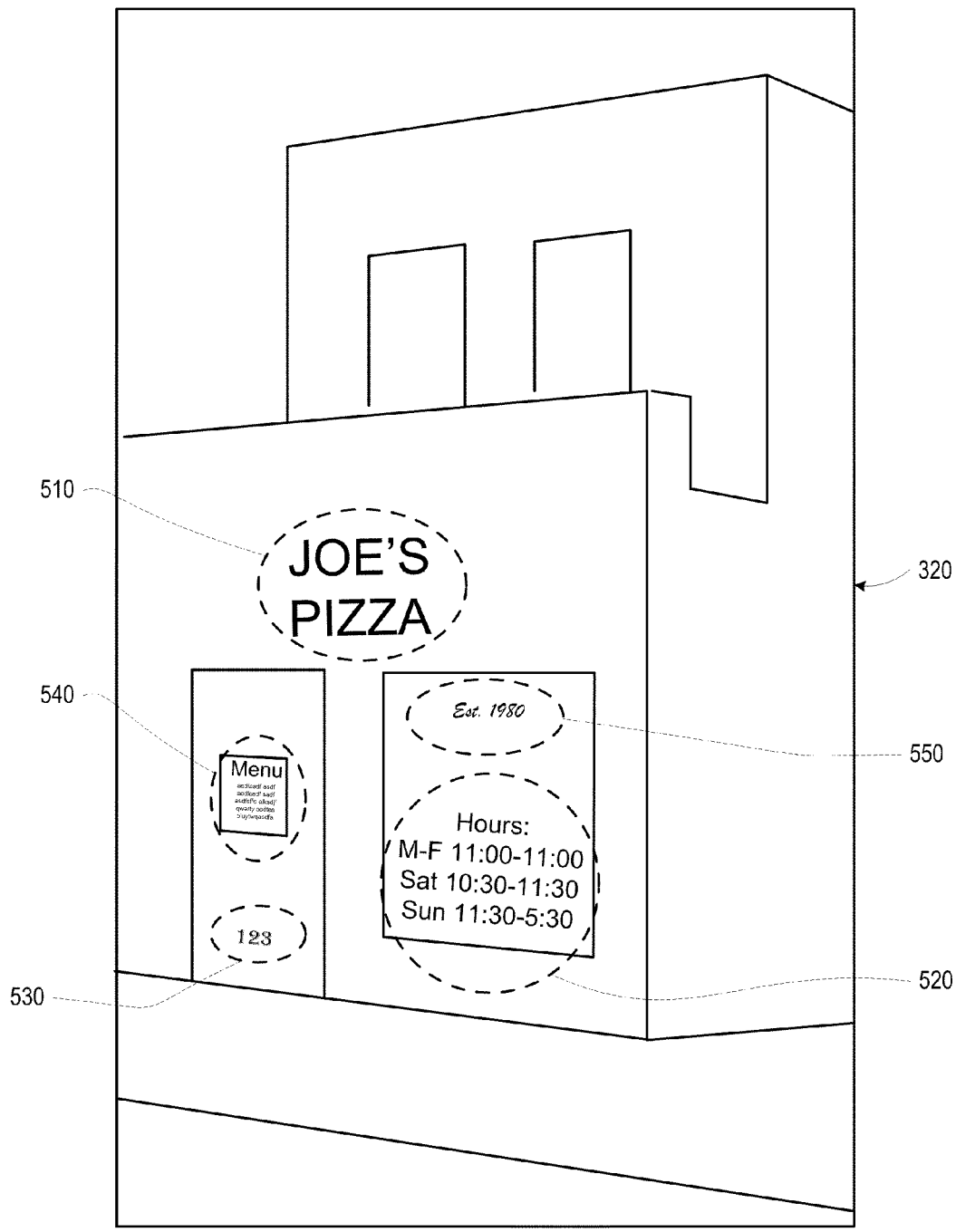
FIG. 5 illustrates an exemplary street level image according to aspects of the disclosure.

FIG. 5 illustrates an exemplary street level image 320 according to aspects of the disclosure. As shown in FIG. 5, a street level image 320 may represent various geographic objects such as a building from a perspective a few feet above the ground. It will be understood that while the street level image 320 may only show a single building for ease of explanation, a street level image may contain as many geographic objects (street lights, mountains, trees, bodies of water, vehicles, people, etc.) in as much detail as the camera was able to capture.

The street level image 320 may be captured by a camera mounted on top of a vehicle at or below the legal limit for vehicle heights (e.g., 7-14 feet) from a camera angle pointing roughly parallel to the ground. Street level images 274 are not limited to any particular height above the ground, for example, a street level image may be taken from the top of a building or at or around the second story of building facades. The images 274 may also have been taken at angles that are not strictly parallel to the ground, e.g., the camera lens may be rotated more than 30 degrees from the ground plane. Panoramic street-level images may be created by stitching together a plurality of photographs taken from different camera angles.

Yet further, rather than being captured by a vehicle equipped for such a purpose, many images registered in a three-dimensional ("3D") space may be used. For example, a user may upload an image and register it with respect to other registered images, such as Google Street View images.

Each street level image may be represented as a set of pixels associated with color and brightness values. For example, if the images are stored in JPEG format, the image will be displayed as a set of pixels in rows and columns, with each pixel being associated with a value that defines the color and brightness of the image at the pixel's location.

Street level image data 274 further associates each street level image with a location, such as the latitude/longitude position of the camera when the image was captured.

In addition to being associated with geographic locations, street level images 274 are typically associated with information indicating the orientation of the image. For example, if the street level images comprises 360° panoramic images, the orientation may indicate the portion of the image corresponding with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

Moreover, some street level images may be associated with a depth map that defines the latitude/longitude/altitude position of each object at each pixel in the street level image. These depth maps may be obtained in a variety of ways, including mounting laser sensors on a vehicle to capture the latitude/longitude/altitude of object surfaces facing the camera, or image processing with stereo and structure-from-motion methods.

As shown in FIG. 1, instructions 240 also include a geocoding routine that relies on data contained in geocoding database 265 to convert geographic locations from one reference system to another. Although the system and method is not limited to any particular set of reference systems, the system and method is particularly advantageous when used to address discrepancies between street addresses and references to a point on the Earth such as latitude/longitude positions. Accordingly, for ease of understanding and not by limitation, it will be assumed that all locations of system 100 are expressed as either street addresses or latitude/longitude positions.

Data 230 may also store listing information identifying local businesses or other objects or features associated with particular geographic locations. For example, each listing 274 may be associated with a name, a category (such as "pizza", "Italian restaurant" or "ballpark"), other information (such as food on a menu) and a location. The location may be expressed with respect to a street address, a latitude/longitude position, or both. The database may be compiled by automatically gathering business information (such as from websites or telephone directories), or users may enter or edit the listing information themselves via web pages served by the server 110.

Various operations in accordance with a variety of aspects of the disclosed embodiments will now be described. It should be understood that the following operations do not have to be performed in the precise order described below. Rather, various steps can be handled in reverse order or simultaneously.

Figure 4:
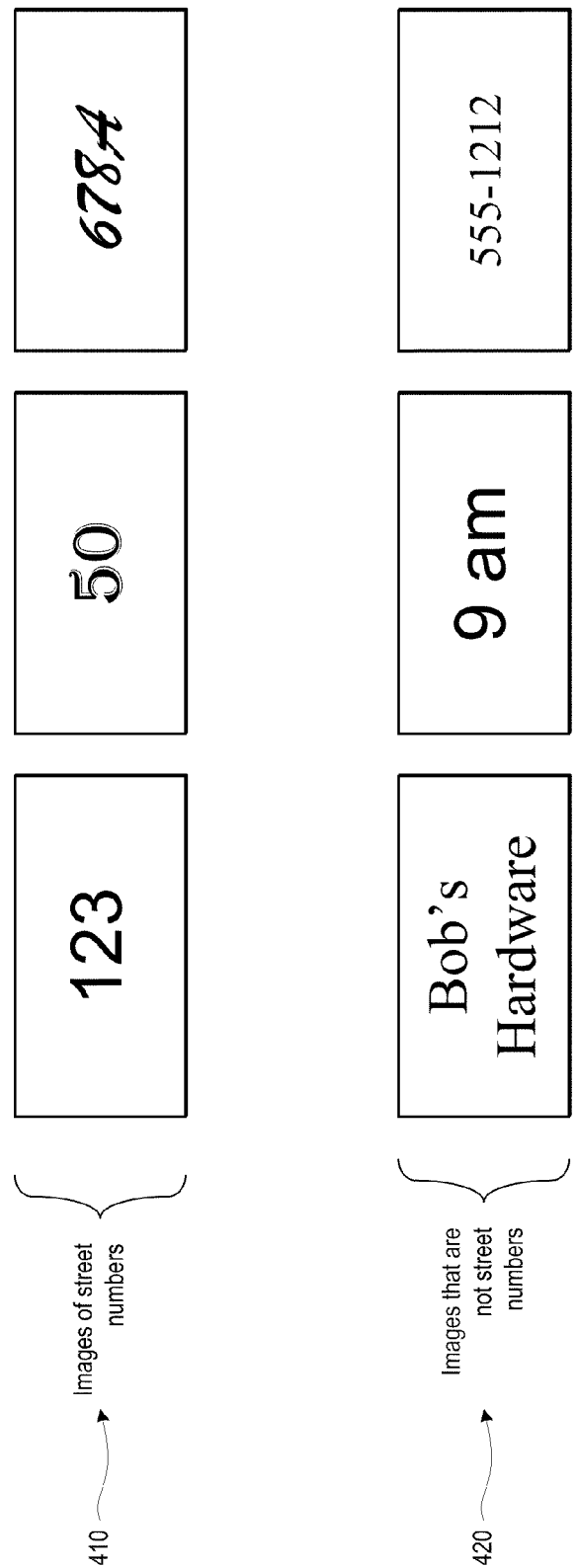
FIG. 4 illustrates exemplary images that may be used to determine the characteristics of building numbers according to aspects of the disclosure.

One aspect of the system and method may include automatically identifying visual characteristics that are shared by many different building numbers. By way of example, the instructions may include a routine that accepts images known to share one or more visual characteristics. In that regard and as shown in FIG. 4, a first set of images 410 may be passed to the routine. These images may comprise digitized photographs of actual building numbers found on various buildings or human-created images of building numbers. By the use of heuristic and other methods, the processor analyzes these images and determines the characteristics that are common to all or a substantial portion of the images. In that regard, the routine's instructions may consider haar wavelets (e.g., arranged blocks of light and dark), oriented edge gradients, and statistics of where edges occur (e.g., integral image over edge gradients). Indeed, the system and method may try different matching methods until it finds the method (or combination of methods) and parameter values that consistently identifies characteristics that are common to images 410.

In one aspect, these characteristics are based on the visual appearance of the image (e.g., a picture of the number "123") rather than an image-neutral representation of the image (e.g., not the three UNICODE values representing the text string "123").

In addition, a second set of images 420 that are known to not represent building numbers may be used to increase the accuracy of the detection of the characteristics common to building numbers. By way of example, this second set of image may comprise text that is commonly found on a building but is not a building number, such as names of businesses, hours of operation and phone numbers. The system and method may be configured such that the use of an increased number of images 410 and 420 results in increased accuracy with respect to determining common characteristics. In one aspect, there are at least 10 images in both the first and second set of images.

Such images may be selected from a variety of sources, such as building number samples selected by a human operator from street level images 274.

The characteristics 271 that are common to building numbers may be stored for later access by a computer. For example, the characteristics may comprise image patterns that are common to some or all of the images in set 410. The characteristics may also comprise image patterns that are unlikely to be in a building number, such as a pattern representing the visual appearance of "9:00" (e.g., hours of operation). The patterns may be stored implicitly as a model based on machine learning techniques (e.g., neural networks, boosted decision trees, and support vector machines (SVMs)) that does not easily lend itself to human interpretation. By way of example, the processor may use boosted decision stumps, which are stored as a series of groups of patterns that are compared to an image patch in a particular order and combination that was learned by a training algorithm.

While references may be made herein to a single building number characteristic for ease of reading, it will be understood to refer as well to a collection of different characteristics.

The system and method may select a street address to confirm. By way of example, the system and method may iterate through a set of street addresses whose latitude/longitude positions have not been confirmed by a human operator. The addresses may also be selected by interpolation of known street addresses. For instance, if the latitude/longitude position of "20 Main Street" and "40 Main Street" is known, the system and method may select all even numbers (representing one side of the street) between 20 and 40 such as "22 Main Street," "24 Main Street," etc. Yet further, listings may be used as a source of addresses.

Figure 3:
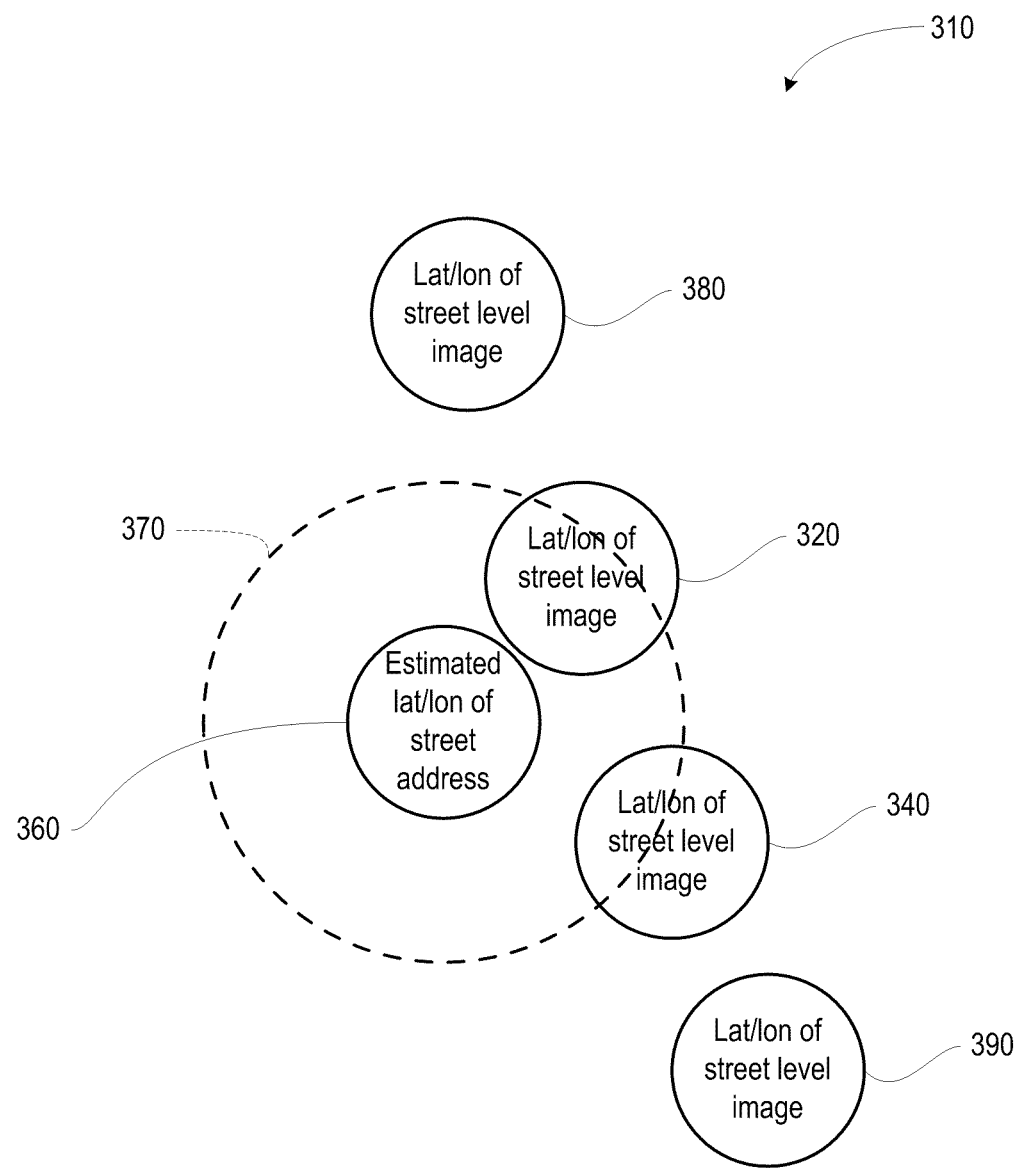
FIG. 3 illustrates a functional diagram of the latitude/longitude location of street level images and the estimated latitude/longitude of a street level address according to aspects of the disclosure.

The system and method may select a set of images that are expected to capture buildings proximate to the address of interest. FIG. 3 illustrates a functional diagram 310 of the latitude/longitude location of street level images and the estimated latitude/longitude of a street level address according to aspects of the disclosure.

As shown in FIG. 3, the server 110 may estimate a latitude/longitude position 360 of the selected address (e.g., "123 Main Street, Springfield"). The server 110 may then query the collection of street level images 274 for images associated with latitude/longitude positions that are within a predefined distance 370 of the estimated latitude/longitude of the street address. By way of example, the server 110 may select any street level image (such as image 320) having a latitude/longitude within 100 or less meters of the estimated latitude/longitude of the street address. Although the other street level images 340, 380 and 390 would not be selected, the range 370 may be expanded to these images, especially if a street address cannot be confirmed as described below based on image 320. The system and method may use other criteria to select street level images, such as selecting all even or odd street level images taken along a particular street.

The selected image may then be analyzed to determine whether any portion of the image is likely to contain a street address. In one aspect, the system and method uses a processor to execute a routine that searches for portions of the image that match building number characteristic 271. As shown in FIG. 5, the street level image 320 may capture a building displaying the name 510 of a business, its hours of operation 520, a number on the door 530, a menu 540 and the year it was established 550.

In that regard, where the building number characteristic contains image patterns representing numeric digits, the portions of the image containing letter characters such as the name 510 and the menu 540 may not be selected. The building number characteristic may also indicate that certain image patterns that do not look like a building number but are commonly found on buildings, such as the image portion containing the hours of operation 520. As a result, the portions containing the year 550 and the number on the door 530 may be selected where they are the portions to have visual features that are most like building numbers.

Figure 6:
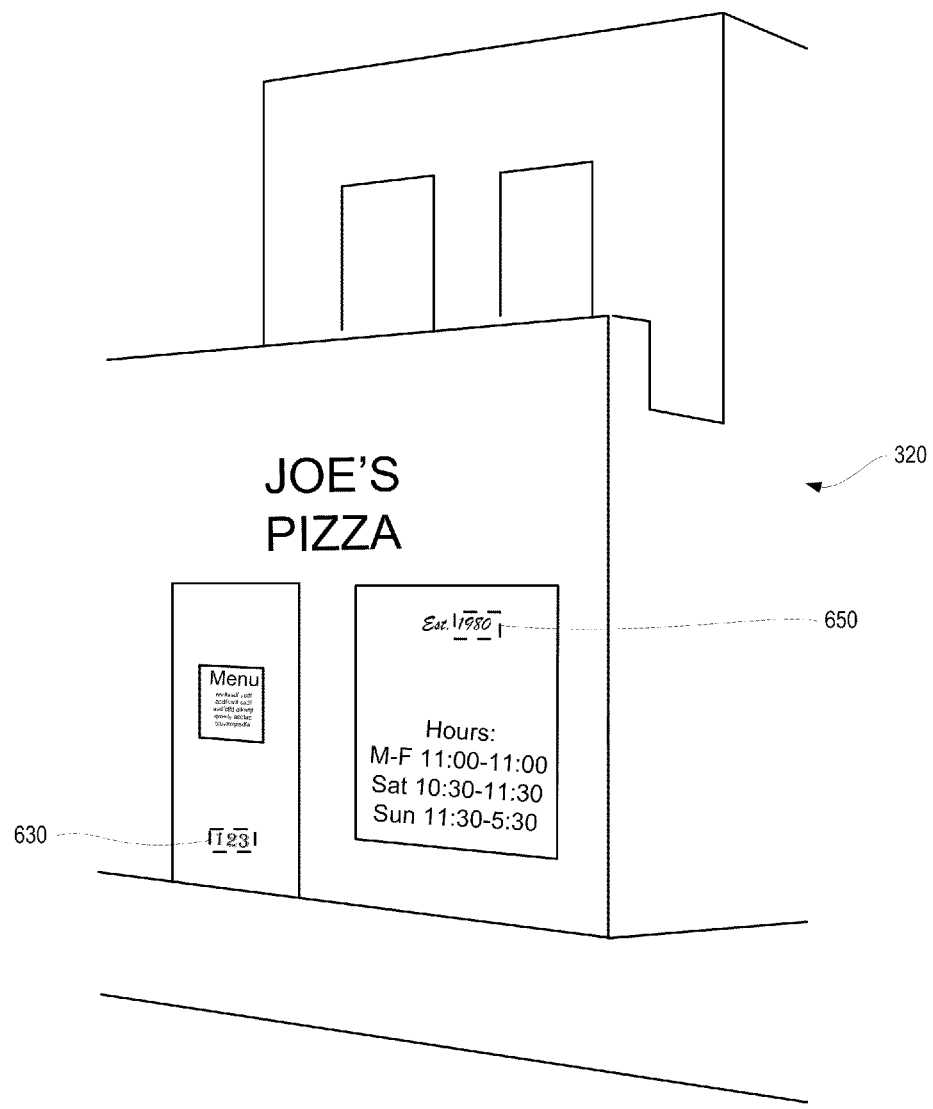
FIG. 6 illustrates another exemplary street level image according to aspects of the disclosure.

In one aspect, the system and method stores the location of a potential building number within an image by storing information identifying the rectangular bounds of the applicable portion of the image. FIG. 6 illustrates an exemplary street level image 320 where rectangular bounds may be defined that contain potential building numbers.

As shown in FIG. 6, the top-left corner, as well as the height and width, of the portion 630 associated with the number on the door and the portion 650 associated with the establishment year may be expressed with respect to the pixels in the street level image 320. The dimensions of the bounds may be determined in accordance with a variety of methods, such as requiring all bounds to have the same dimensions. Alternatively, the routine that is used to find the portions 630/650 may return the smallest rectangle that bounds a potential building number.

Figure 7:
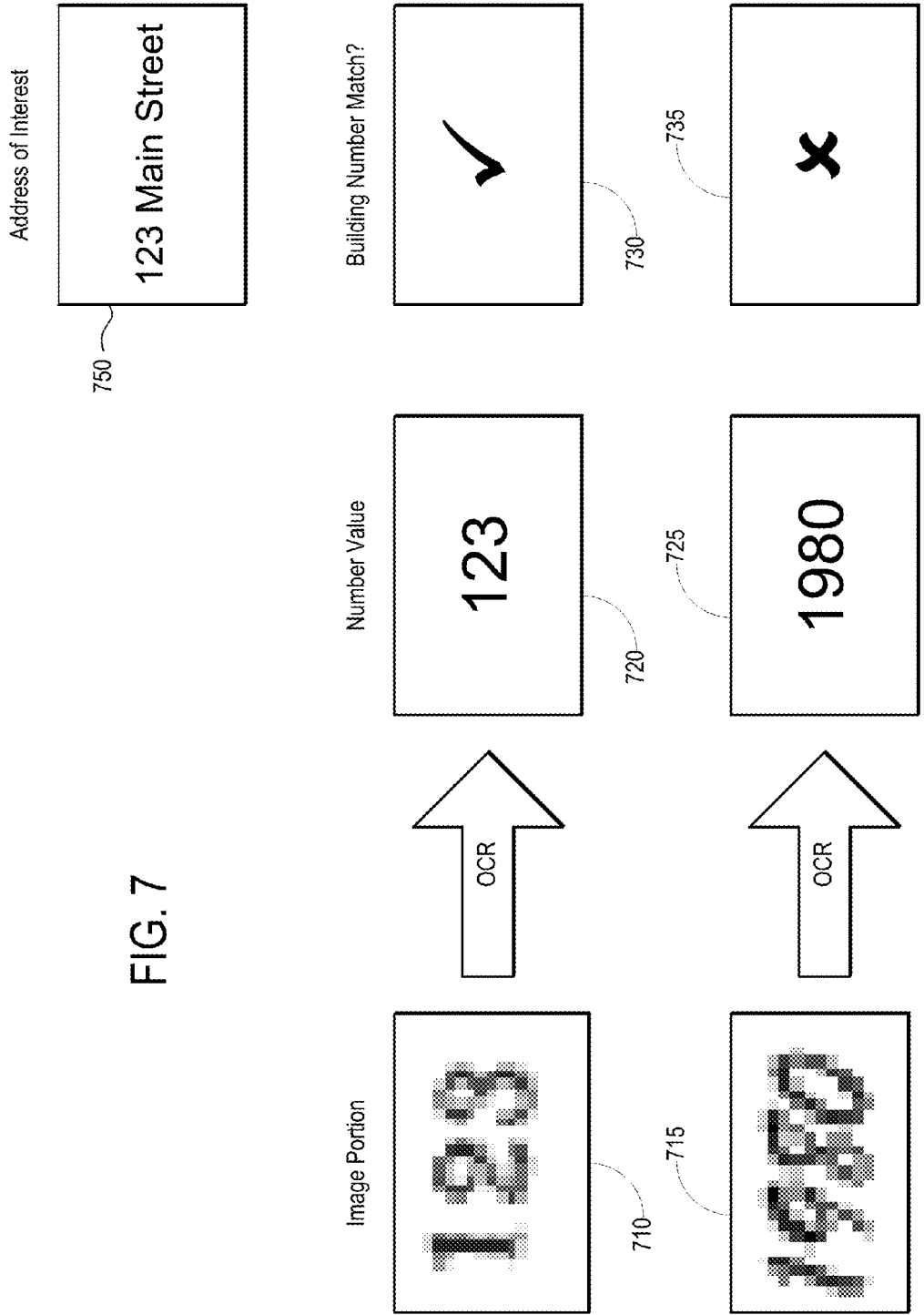
FIG. 7 illustrates logic flow that includes exemplary sample data according to aspects of the disclosure.

After the image portions 630/650 containing potential building numbers are identified, the system and method may attempt to extract image-neutral content from the image portions. FIG. 7 illustrates logic flow implemented by the system and method used in extracting the image-neutral content.

By way of example, the processor 210 may use an image recognition technique, such as optical character recognition (OCR), to identify one or more alphanumeric characters in image bitmaps 710 and 715 (which are encompassed within bounds 630 and 650, respectively). An image portion 710 may thus be associated with an integer value 720 (based on the characters appearing within the image portion), e.g., an integer value of "123". An image portion 715 may similarly be associated with an integer value 725, e.g., an integer value of "1980". The image portions 710/715 also may be associated with text strings. In one aspect, the parameters of the OCR-related routine are selected so as to prefer digit characters over non-digit characters. By way of example, a dictionary, such as an English-language dictionary, used by an OCR routine may be limited. The language model may also prefer strings of digits over a mix of digits and non-digit characters.

The processor 210 may then compare the extracted values against the building number of the current address of interest. For instance, the integers "123" and "1980" may be compared with the building number in the address "123 Main Street," which is the address that was used to select street level image 320. If the extracted value matches the building number of the selected address, the processor 210 may maintain a reference to the matching image portion 710 and discard any further reference to the non-matching portion 715.

In another aspect, the system and method may consider the image portions 710/715 to match the selected address where the extracted value is substantially equal to the selected address. By way of example, any number within the integer range of "120" to "126" (e.g., 123+/−3) may be considered a match. By using a range, the system and method may select image portions containing building numbers even where the extrapolation of the address' latitude/longitude position was inaccurate. The range of tolerance may be selected using various methods, such as using: constant values (e.g., +/−3 integer values); the entire range of even or odd street addresses between street addresses that have already been confirmed (e.g., a human operator stored, at the time the street level images were captured, the building numbers of buildings at intersections) or; the expected density of building numbers within a certain physical distance (e.g., a 100*m* section of a Manhattan street may include more building numbers than a 100*m* of a rural road, which may counsel if favor of using a higher tolerance in Manhattan).

In still another aspect, the system and method may perform batch processing with respect to a large collection of addresses. The foregoing building number identification and extraction may be performed once for each image and the results used to match against multiple addresses within a range. As noted above, each stage of the foregoing process may also be performed by a different set of computers.

In yet another aspect, the criteria used by the foregoing routines may be chosen so that the system selects too many matching image portions rather than too few. For instance, the criteria may be selected so that 10% of the building numbers in a street level image are missed, but 50°-700 of the potential matches do not actually contain a building number.

Figure 8:
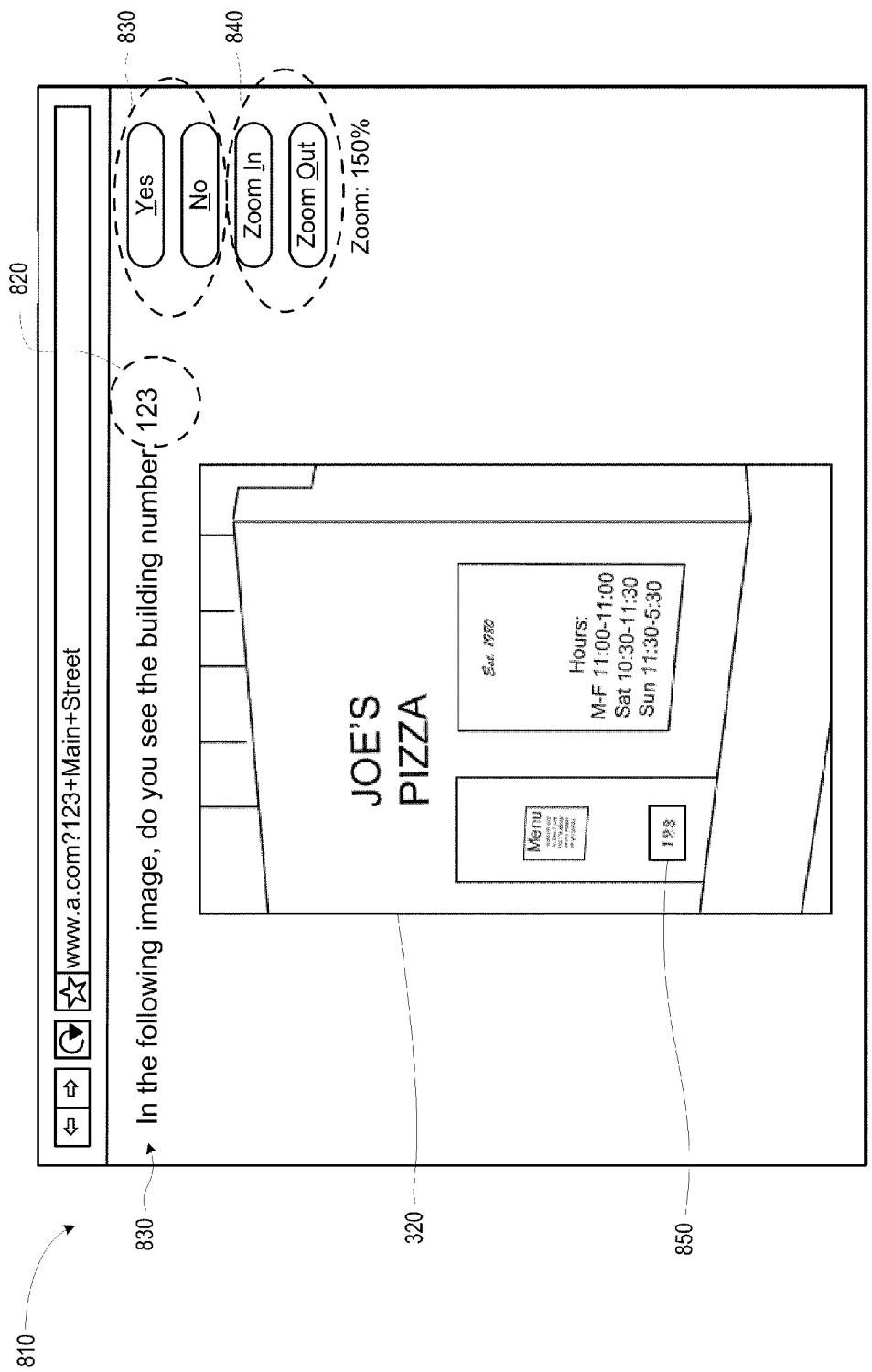
FIG. 8 illustrates an exemplary screen shot displaying information to a human operator according to aspects of the disclosure.

A human operator may be asked to confirm whether the identified image portions are likely to be building numbers. FIG. 8 illustrates an exemplary screenshot 810 displaying information to a human operator for confirming whether identified image portions are likely to be building numbers.

In one embodiment, a user may be shown: the potential building number value 820 extracted from the street level image 320; the street level image 320; a box 850 or other visual indicia that highlights the image portion that was determined to be a potential building number; a prompt 830 requesting that the user confirm that the value 820 appears to match a building number shown in the image; buttons 830 by which the user may indicate his or her response to the prompt 830; and; and other buttons 840 that allows the user to zoom or pan the street level image.

Figure 9:
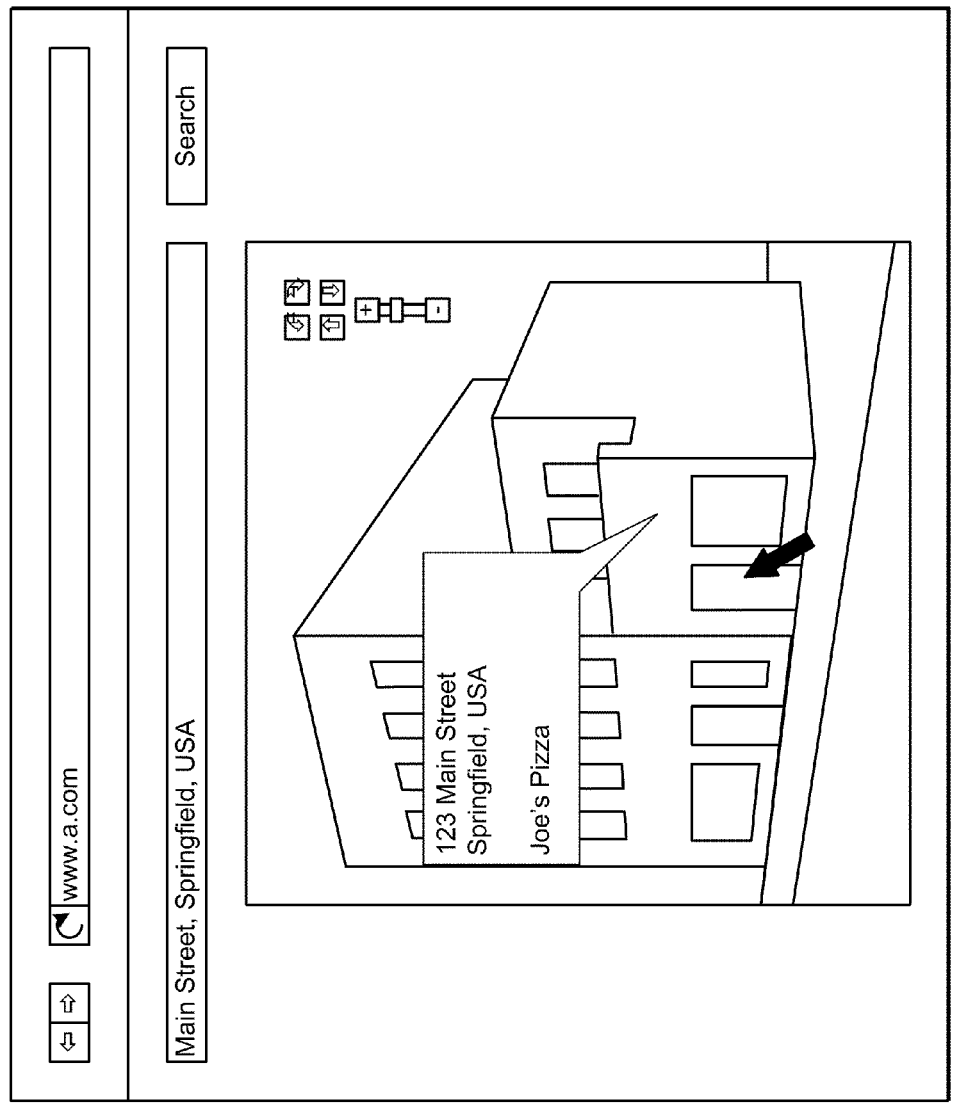
FIG. 9 illustrates an exemplary screen shot of information displayed to an end user according to aspects of the disclosure.

In that regard, a human operator may be asked to look at the image 320 and confirm, based on his or her visual inspection, whether a number extracted from an image matches a building number shown in the image 320.

Where multiple portions of the street level image 320 were identified as showing potential building numbers, the human operator may also be asked to select the portion that accurately identifies the building number. In yet another aspect, multiple buildings may be shown to the human operator, and the operator may be asked to select each highlighted region that accurately identifies a building number.

Where the human operator verifies that the extracted value is indeed a building number, the results may be stored for later use. For example, the processor 210 may store a link in memory 220 that associates the confirmed address (e.g., "123 Main Street") with street level image 320. Where the street level image is a panoramic image, the address may be further associated with the orientation of the image that corresponds with the building number.

Where the geographic positions of the building surfaces shown in the street level image are associated with latitude/longitude/altitude data, such surface information may also be associated with the confirmed address. For example, each pixel of the image 320 that shows a portion of building surface may be associated with a latitude/longitude/altitude position. One method of storing such surface data is to use a laser range finder when a picture of the building surfaces is taken, and subsequently calculating surface positions by using the known or recorded position of the camera and the distances/orientations collected by the laser range finder. Thus, as shown in FIG. 9, where an end user views the street level image and selected or panned to a particular pixel within the image, the street address of the building at that pixel may be shown with a high degree of accuracy. The building number also may be associated with the entire range of latitude/longitude positions occupied by the building.

Where the server 110 has access to listing information associated with the building's address, such as the name of the businesses at that address, the listing information may be shown to the user as well.

Where the human operator failed to confirm the suggested building number, the system and method may select other street level images to be analyzed, or suggest other portions of the street level image 320 that may show a building number.

Many of the foregoing features may also be combined to create a score that is used by the system and method to determine whether the server 110 should request human. By way of example only, the score may be determined based on values indicative of: the extent of similarity between the image portion and image patterns of building numbers; the confidence that the characters returned by an OCR routine match the characters displayed in the image; the confidence that the characters returned by an OCR routine match typical building numbers (e.g., the presence of a non-numeric character in the middle of numeric characters may result in a low confidence score); the number of digits in an extracted number; the count of images, or conflicting images, in which the number appears; and the absolute value of the difference between the expected address and the building number extracted from the portion. This final score may be compared against a threshold to determine which portions should be sent to a human operator for confirmation.

Alternatively, human confirmation may be skipped in matches with high confidence scores. In other words, a human operator may be asked to confirm building numbers where there are borderline confirmation scores. In that regard, there may be at least two thresholds: (1) a minimum threshold below which the building number may not be associated with the address based on that image portion and (2) a threshold above which the building number may be associated with the address without awaiting human confirmation. Yet further, the human operator confirmation itself may be used as a component of a total score that is used to determine whether a link between the address and the street level image should be stored.

Figure 10A:
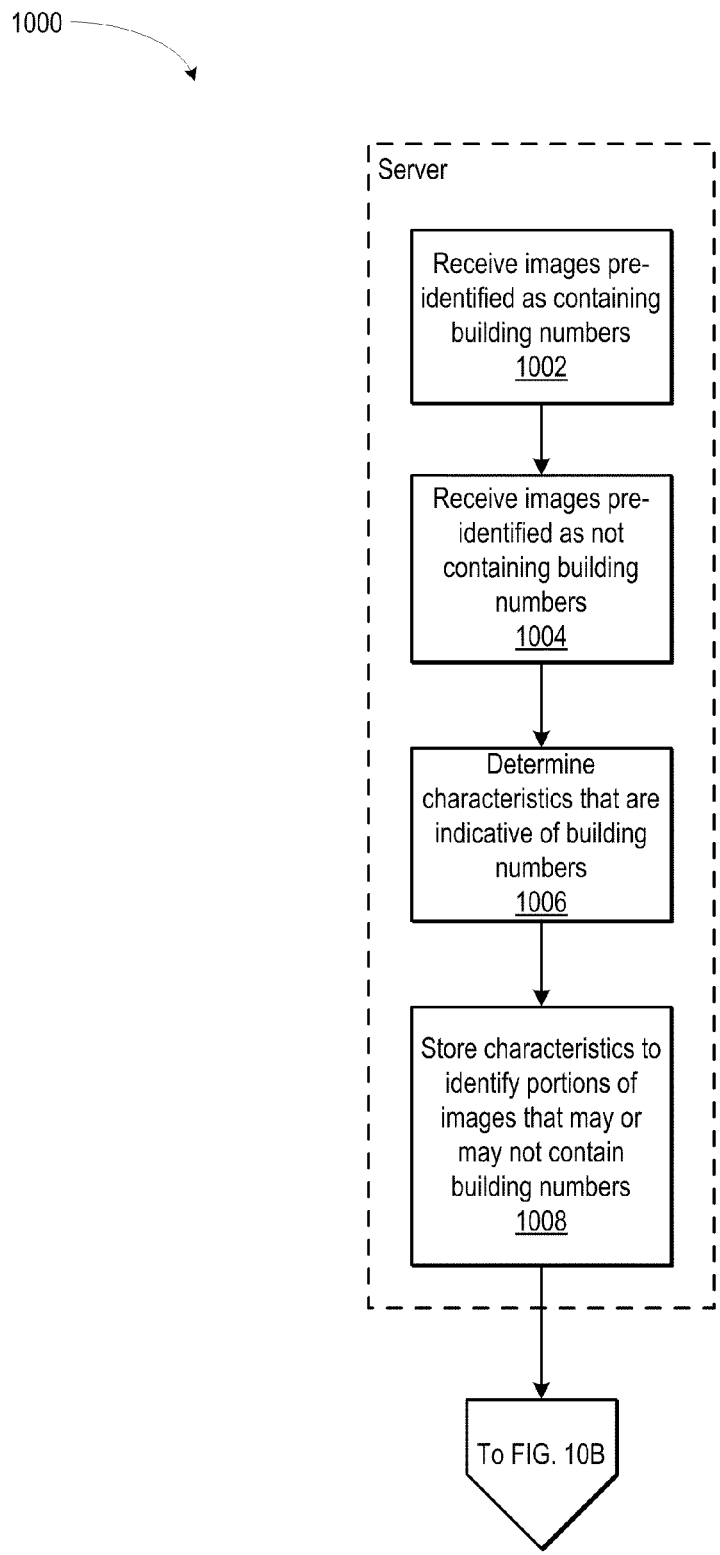
FIGS. 10A-10C illustrate exemplary logic flow for determining building numbers in images according to aspects of the disclosure.
Figure 10B:
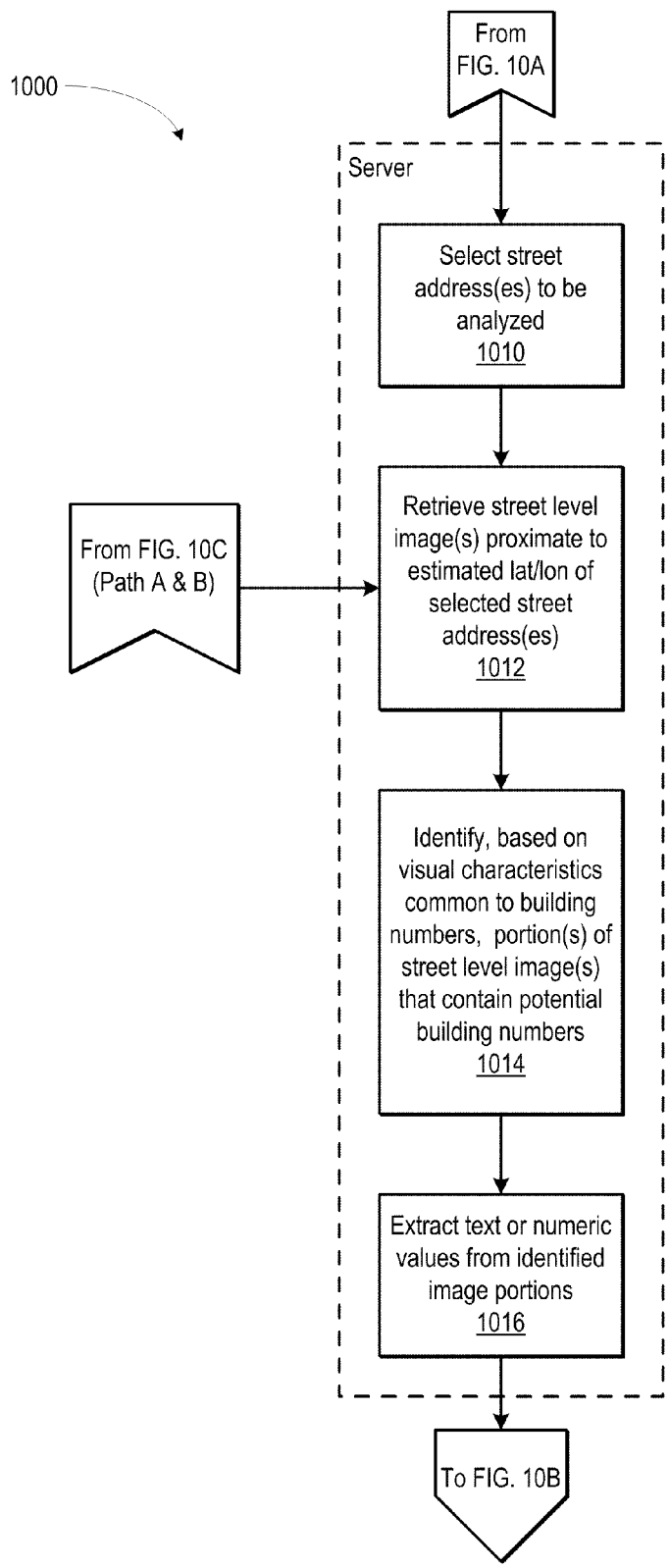
Figure 10C:
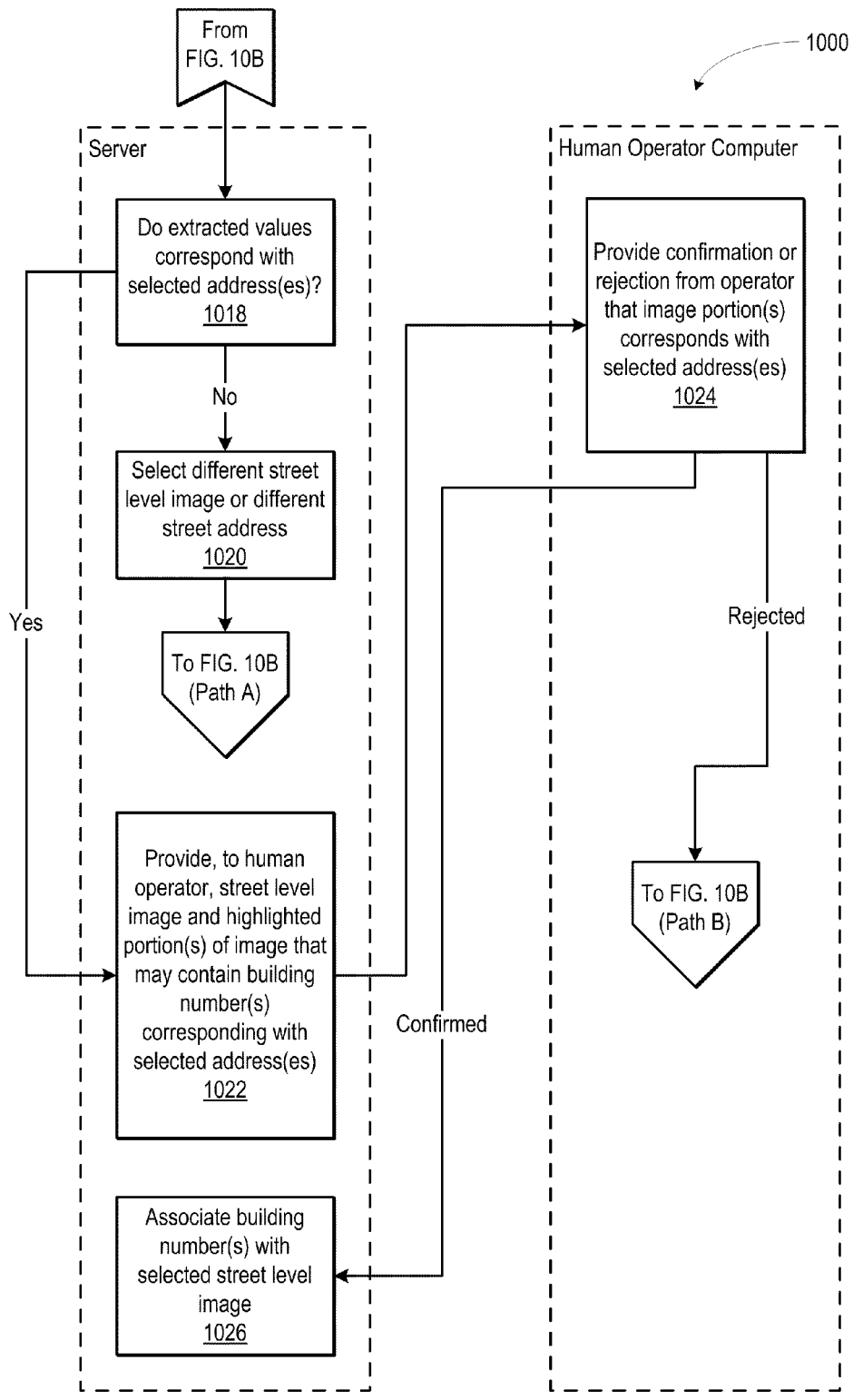

FIGS. 10A-10C illustrate exemplary logic flow 1000 for determining building numbers in images according to aspects of the disclosure. Initially, the server 110 may receive images previously identified as images containing one or more building numbers (Block 1002). The server 110 may then receive images previously identified as not containing building numbers (Block 1004). As discussed above, this second set of images may comprise text that is commonly found on a building but is not a building number, such as names of businesses, hours of operation and phone numbers.

The server 110 may then leverage the differences between the two sets of images to determine characteristics that are indicative of building numbers (Block 1006). While the server 110 may use various matching techniques to identify characteristics of the building numbers (e.g., haar wavelets, oriented edge gradients, etc.), the use of the second set of images not containing building numbers may further increase the accuracy of the detection of the characteristics common to building numbers. The server 110 may then store these characteristics (Block 1008) in a memory, such as the memory 220, to later identify portions of images that may or may not contain building numbers.

FIG. 10B continues the logic flow 1000 from FIG. 10A and focuses on the extraction of text or numeric values from identified image portions. Initially, the server 110 may receive a selection of, or may automatically select, a street address to be analyzed (Block 1010). The server 110 may then retrieve one or more street level images proximate to the estimated latitude and longitude of the selected street address (Block 1012). To recall, FIG. 3 illustrates a functional diagram 310 of the latitude/longitude location of potential street level images 320/340/380/390 that may correspond to the estimated latitude/longitude of a selected street level address 360.

Using the previously stored characteristics of building numbers, the server 110 may then identify one or more portions in the one or more retrieved street level images proximate to the selected street address that contain potential building numbers (Block 1014). The server 110 may then extract the text or numeric values from the identified one or more portions in the one or more retrieved street level images (Block 1016). As mentioned above, the server 110 may employ image recognition techniques, such as optical character recognition, to extract the text or numeric values.

FIG. 10C continues the logic flow 1000 from FIG. 10B and includes the confirmation process for confirming whether a street level image contains an extracted text or numeric value. With the extracted text or numeric values, the server 110 may first determine whether the extracted text or numeric values correspond to the selected one or more street addresses to be analyzed from Block 1010 (Block 1018). Where the extracted text or numeric values do not correspond with a selected street address or with one or more selected street addresses, the server 110 may then select a different street level image or a different street address for further analysis and processing (Block 1020). At this point the logic flow may return to Block 1012 of FIG. 10B.

However, where the server 110 determines that the extracted text or numeric values do correspond with a selected street address or with one or more selected street addresses for a street level image, the server 110 may provide to a human operator the corresponding one or more street level images and highlighted portions of the one or more street level images that may contain potential building numbers (Block 1022). As discussed with reference to FIG. 8, the human operator may be provided with street level image having the highlighted portions as shown in the illustrated screenshot 810. The human operator may then provide a confirmation or rejection as to whether the potential building numbers in the highlighted portions correspond to the one or more street addresses for the one or more street level images (Block 1024). Where the human operator provides a confirmation, the server 110 may associate the extracted text or numeric values with the street level image (Block 1026). Thus, when a user enters in an address, a street level image of the building corresponding to the entered address may be displayed (e.g., the illustration of the street level image of FIG. 9). However, should the human operator provide a rejection to the server 110, the logic flow 1000 may return to Block 1012 of FIG. 10B.

In this manner, the disclosed system and method provide a mechanism by which one or more street level images are associated with a particular address. The server 110 provides that a given street level image should be associated with a given address through the use of optical character recognition and, in particular, by recognizing potential building numbers in a street level image. Moreover, by leveraging human moderation, the disclosed system and method ensures a higher degree of accuracy that a street level image corresponds to a particular street address than if the server 110 solely relied on optical character recognition.

Most of the foregoing alternative embodiments are not mutually exclusive, but may be implemented in various combinations to achieve unique advantages. As these and other variations and combinations of the features discussed above can be utilized without departing from the disclosed embodiments as defined by the claims, the foregoing description of the embodiments should be taken by way of illustration rather than by way of limitation of the disclosure as defined by the claims. It will also be understood that the provision of examples in this disclosure (as well as clauses phrased as "such as," "including" and the like) should not be interpreted as limiting this disclosure to the specific examples; rather, the examples are intended to illustrate only one of many possible embodiments.

The invention claimed is:

1. A method comprising:
   receiving, by one or more processors, a first set of images of numbers on buildings associated with the address of such building;
   receiving, by the one or more processors, a second set of images that do not contain numbers on buildings associated with the address of a building;
   determining, by the one or more processors, a characteristic that is present within a plurality of the images of the first set but is not present within the image of the second set, wherein the characteristic is visually similar to one or more portions of one or more pictures of building numbers;
   receiving, by the one or more processors, an image of a building from a plurality of images;
   determining, by the one or more processors, whether a portion of the image of the building includes numbers matching the characteristic;
   storing, by the one or more processors, an identification of the portion of the image of the building that matches the characteristic;
   extracting, by the one or more processors, the identified portion of the image;
   when the extracted portion of the image corresponds with a selected address, providing, by the one or more processors, the image of the building and the extracted portion to a human operator; and
   when the extracted portion of the image does not correspond with the selected address, selecting, by the one or more processors, a different image from the plurality of images and repeating the determining, storing, and extracting steps with the different image.

2. The method of claim 1 wherein the first set of images and the second set of images are selected by a human operator from among a plurality of images.

3. The method of claim 1 wherein the characteristic comprises an image pattern.

4. The method of claim 1 wherein there at least 10 images in the first set and 10 images in the second set.

5. The method of claim 1, further comprising:
   in response to providing the image of the building and the extracted portion to a human operator, receiving confirmation information; and
   in response to receiving the confirmation information, associating the numbers matching the characteristic with the image of the building.

6. The method of claim 5, further comprising:
   receiving a request identifying an address;
   identifying the numbers matching the characteristic based on the address; and
   providing the image of the building associated with the numbers matching the characteristic identified based on the address.

7. A system comprising one or more processors configured to:
   receive a first set of images of numbers on buildings associated with the address of such building;
   receive a second set of images that do not contain numbers on buildings associated with the address of a building;
   determine a characteristic that is present within a plurality of the images of the first set but is not present within the image of the second set, wherein the characteristic is visually similar to one or more portions of one or more pictures of building numbers;
   receive an image of a building from a plurality of images;

determine whether a portion of the image of the building includes numbers matching the characteristic;

store an identification of the portion of the image of the building that matches the characteristic;

extract the identified portion of the image;

when the extracted portion of the image corresponds with a selected address, provide the image of the building and the extracted portion to a human operator; and when the extracted portion of the image does not correspond with the selected address, select a different image from the plurality of images and repeating the determining, storing, and extracting steps with the different image.

8. The system of claim 7 wherein the first set of images and the second set of images are selected by a human operator from among a plurality of images.

9. The system of claim 7 wherein the characteristic comprises an image pattern.

10. The system of claim 7 wherein there at least 10 images in the first set and 10 images in the second set.

11. The system of claim 7, wherein the one or more processors are further configured to:

in response to providing the image of the building and the extracted portion to a human operator, receive confirmation information; and in response to receiving the confirmation information, associate the numbers matching the characteristic with the image of the building.

12. The system of claim 11, wherein the one or more processors are further configured to:

receive a request identifying an address;

identify the numbers matching the characteristic based on the address; and provide the image of the building associated with the numbers matching the characteristic identified based on the address.

13. A non-transitory, computer-readable medium storing instructions, the instructions when executed by one or more processors, cause the one or more processors to perform a method, the method comprising:

receiving a first set of images of numbers on buildings associated with the address of such building;

receiving a second set of images that do not contain numbers on buildings associated with the address of a building;

determining a characteristic that is present within a plurality of the images of the first set but is not present within the image of the second set, wherein the characteristic is visually similar to one or more portions of one or more pictures of building numbers;

receiving an image of a building from a plurality of images;

determining, with the processor, whether a portion of the image of the building includes numbers matching the characteristic;

storing an identification of the portion of the image of the building that matches the characteristic;

extracting the identified portion of the image;

when the extracted portion of the image corresponds with a selected address, providing the image of the building and the extracted portion to a human operator; and when the extracted portion of the image does not correspond with the selected address, selecting a different image from the plurality of images and repeating the determining, storing, and extracting steps with the different image.

14. The non-transitory, computer-readable medium of claim 13, wherein the first set of images and the second set of images are selected by a human operator from among a plurality of images.

15. The non-transitory, computer-readable medium of claim 13, wherein the characteristic comprises an image pattern.

16. The non-transitory, computer-readable medium of claim 13, wherein there at least 10 images in the first set and 10 images in the second set.

17. The non-transitory, computer-readable medium of claim 13, wherein the method further comprises:

in response to providing the image of the building and the extracted portion to a human operator, receiving confirmation information; and in response to receiving the confirmation information, associating the numbers matching the characteristic with the image of the building.

18. The non-transitory, computer-readable medium of claim 17, wherein the method further comprises:

receiving a request identifying an address;

identifying the numbers matching the characteristic based on the address; and providing the image of the building associated with the numbers matching the characteristic identified based on the address.

* * * * *